United States Patent
Choiniere

(10) Patent No.: US 11,047,958 B1
(45) Date of Patent: Jun. 29, 2021

(54) SENSOR FUSING USING 3D FIBER COUPLED SCANNING LIDAR

(71) Applicant: BAE SYSTEMS Information and Electronic Systems Integration Inc., Nashua, NH (US)

(72) Inventor: Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/817,939

(22) Filed: Mar. 13, 2020

(51) Int. Cl.
| | |
|---|---|
| H04N 13/207 | (2018.01) |
| G01S 7/48 | (2006.01) |
| G01S 17/894 | (2020.01) |
| G01S 7/481 | (2006.01) |
| G01S 17/86 | (2020.01) |
| G06K 9/62 | (2006.01) |
| G06T 7/73 | (2017.01) |
| G06T 7/62 | (2017.01) |

(52) U.S. Cl.
CPC .......... *G01S 7/4802* (2013.01); *G01S 7/4818* (2013.01); *G01S 17/86* (2020.01); *G01S 17/894* (2020.01); *G06K 9/6289* (2013.01); *G06T 7/62* (2017.01); *G06T 7/73* (2017.01); *H04N 13/207* (2018.05); *G06K 2209/21* (2013.01); *G06T 2207/10028* (2013.01)

(58) Field of Classification Search
CPC ............. G06T 7/73; G06T 2207/10032; G06T 2207/30244; G06T 2207/30232; G01S 17/86; G01S 17/89
See application file for complete search history.

(56) References Cited

U.S. PATENT DOCUMENTS

| | | | |
|---|---|---|---|
| 6,262,800 B1 | 7/2001 | Minor | |
| 7,742,151 B2 | 6/2010 | Krasutsky | |
| 8,373,105 B2 | 2/2013 | Eiane et al. | |
| 10,082,367 B2 | 9/2018 | Bowden-Peters | |
| 2011/0304737 A1* | 12/2011 | Evans | G01S 3/7864 |
| | | | 348/169 |
| 2019/0107606 A1* | 4/2019 | Russell | G01S 7/4808 |
| 2020/0108926 A1* | 4/2020 | Smith | F41H 11/02 |
| 2020/0226388 A1* | 7/2020 | Ghessassi | H04N 21/6582 |
| 2020/0285953 A1* | 9/2020 | Samples | G06K 9/6263 |

OTHER PUBLICATIONS

Hubbard et al., "Low-cost Semi-Active Laser Seekers for US Army Applications", Weapons and Material Research Directorate, Army Research Laboratory, APG MD 21005-5066, Dr. T.G. Horwath Consulting, LLC, at least as early as Feb. 20, 2020.

* cited by examiner

*Primary Examiner* — Obafemi O Sosanya
(74) *Attorney, Agent, or Firm* — KPIP Law, PLLC; Scott J. Asmus

(57) ABSTRACT

The system and method for target identification using a comparatively low resolution imager combined with a 3D LIDAR on-board a round. This system and method are applicable to any round looking for a 3D target ID. A round, as used herein, may be a weapon, a projectile, a ballistic, a bullet, a munition, a guided weapon, or the like. By coupling a fiber laser of a LIDAR with a piezoelectric oscillator, or actuator, to scan a target and an avalanche photodiode (APD) detector array, or other high resolution sensor, target dimensional information can be used to increase the probability of an accurate target ID.

20 Claims, 6 Drawing Sheets

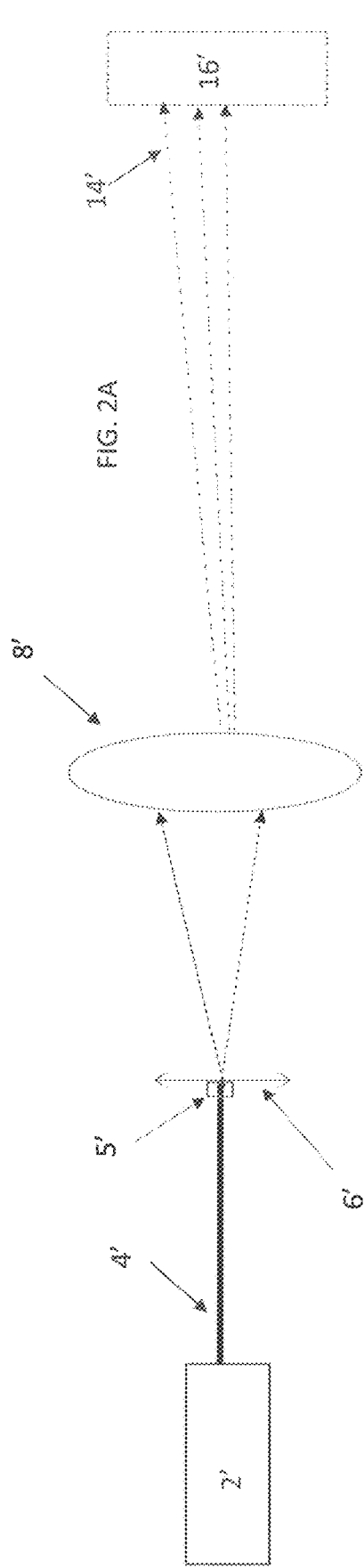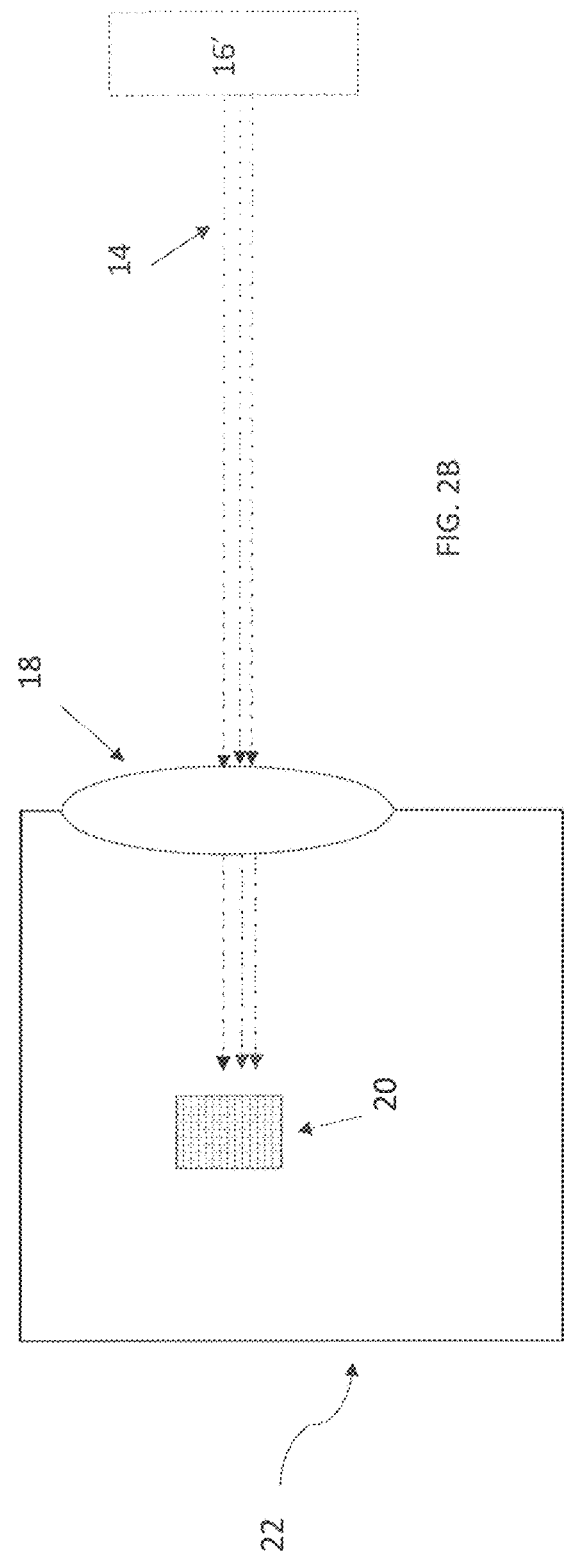
FIG. 2A
FIG. 2B

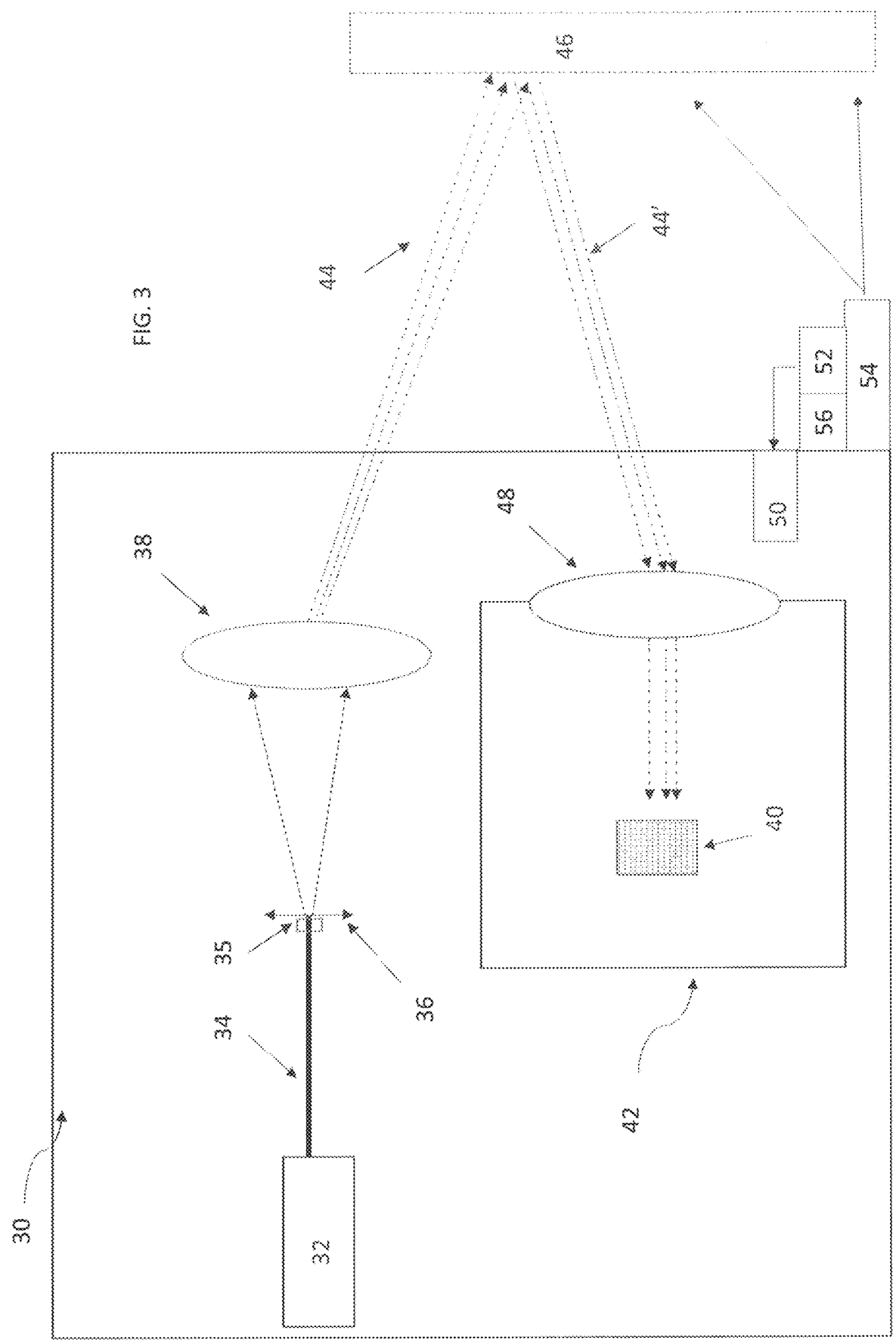

SENSOR FUSING USING 3D FIBER COUPLED SCANNING LIDAR

FIELD OF THE DISCLOSURE

The present disclosure relates to target identification and more particularly to sensor fusing for target identification using a three dimensional fiber coupled scanning LIDAR and an LWIR imager for gathering target dimensional information.

BACKGROUND OF THE DISCLOSURE

In the complex realm of target identification for projectiles, conventional systems use a single camera (LWIR) and perform image matching with a predetermined library of known targets. A fundamental issue with this approach is the need for sufficient spatial resolution (pixels on target) to confirm an accurate match (e.g., a target ID—typically 12-20 pixels across the length of the target). The high level of resolution needed for an accurate target ID limits the imager's field of view (FOV) and the resulting ability to hunt for targets over a large area. In remote sensing, ground sample distance (GSD), in a digital photo of the ground from air or space, is the distance between pixel centers measured on the ground. For example, in an image with a one-meter GSD, adjacent pixels image locations are 1 meter apart on the ground. If the GSD of the imager is 0.25 meters, which is typical for automated target recognition (ATR), then a 1280×1024 pixel frame size would result in three-dimensional target area of only 320×256 meter. Current solutions that use a single modality (e.g., an LWIR imager) are limited by the frame size of the imager and handicapped in either target ID or target area box size.

Wherefore it is an object of the present disclosure to overcome the above-mentioned shortcomings and drawbacks associated with the conventional target identification.

SUMMARY OF THE DISCLOSURE

In contrast, using 3D LIDAR (Light Detection and Ranging), coupled with an LWIR imager, as disclosed herein, provides an orthogonal modality and provides important target dimensional information. The LWIR imager, with reduced target resolution, can provide preliminary target identification and location over a larger target area, e.g., 1.5 Km at 1.5 m GSD and then place the target in a queue and the additional application of the LIDAR can provide the three dimensions of the target—height, length, and width to provide accurate target ID. The ability to measure dimensions at 0.25 m to 1.5 m resolution simplifies target matching with an on-board library. This methodology can also aid in determining a target's pose, removing a tremendous amount of processing from the imager's processor. The coordination of the LWIR imager and the LIDAR provides an enhanced seeker capability.

It has been recognized that limited laser power prevents a large field of regard (FOR) scanning in the application of 3D LIDAR. The ability to install a high fidelity laser pointing system (1 mrad) at high bandwidth (0.5 to 1 KHz) is costly (>$100K), large (0.5 ft$^3$), and power hungry (>200 watts). The approach of the present disclosure lowers the cost <$3K, the size <10 in$^3$, and the power to <10 watts.

One aspect of the present disclosure is a system for target identification, comprising: an imager configured to: collect imagery from a scene within a field of view of the imager; spatially search the imagery for target-sized objects; generate a target list of potential targets and respective target positions; and send the target list to a LIDAR module; the LIDAR module having a fiber laser with a field of view augmented with controlled actuators and being configured to: generate a series of energy pulses; coordinate the series of pulses via a controller for one or more actuators to generate a high fidelity scan pattern for a given field of regard; and collect data sets comprising time of arrival for each of the series of pulses reflected off an area of the scene selected based on the target list, and corresponding intensity at each pixel in a sensor; a processor configured to: receive the data sets from the LIDAR module; generate 3D images of an area of the scene selected based on the target list; correlate the 3D images to the imagery from the imager; perform a target ID function; and update the target list.

One embodiment of the system is wherein the LIDAR is SWIR LIDAR having piezoelectric actuators and a sensor with high resolution for determining time of flight of the pulses to within 1 nanosecond. In some cases, the LIDAR module comprises a gimbal to decouple a center line of the imager to the LIDAR. In some cases, the imager is an LWIR imager.

In certain embodiments, the target list is updated based on target confidence levels and target priority criteria. In some cases, the target list is generated based on angular locations in the scene.

In another embodiment of the system, the data sets comprises time of arrival information for each pixel and for each pixel set collected via the sensor.

Another aspect of the present disclosure is a method for target identification, comprising: collecting imagery from a scene via an imager; spatially searching the imagery for target-sized objects via the imager; generating a target list of potential targets and respective target positions via the imager; and sending the target list to a LIDAR module via the imager; generating a series of energy pulses via the LIDAR module; coordinating the series of pulses of the LIDAR module via a controller for one or more piezoelectric actuators; and collecting data sets, via the LIDAR module, comprising time of arrival for each of the series of pulses reflected off an area of the scene selected based on the target list, and corresponding intensity at each pixel in a detector; receiving the data sets from the LIDAR module via a processor; generating, via the processor, 3D images of an area of the scene selected based on the target list; correlating, via the processor, the 3D images to the imagery from the imager; performing, via the processor, a target ID function; and updating the target list via the processor.

One embodiment of the method is wherein the LIDAR is SWIR LIDAR and the detector is an APD detector. In some cases, the LIDAR module comprises a gimbal to decouple a center line of the imager to the LIDAR. In certain cases, the LIDAR lases the one or more targets completely or in sections by using the actuators for controlling an optical fiber's position relative to a lens. In certain embodiments, the imager is an LWIR imager.

Another embodiment of the method is wherein the target list is updates based on target confidence levels and target priority criteria. In certain embodiments, the target list is generated based on angular locations in the scene. In some cases, the data sets comprises time of arrival information for each pixel and for each pixel set.

Yet another embodiment of the method further comprises utilizing the LIDAR module to determine the dimensions, pose and 3D contours for one or more targets combined with contour lines from the imager to provide a high level library match of the one or more targets. In some cases, the method further comprises utilizing one or more of a height, a length and a width measurement to eliminate targets of the wrong scale and size. In some embodiments, the method further comprising utilizing the LIDAR module to determine a pose of one or more targets and selectively processing specific poses rather than all possible poses presented in the library of a specific target or set. In still yet other embodiments, the method further comprises providing internal form features' dimensions via the LIDAR module to distinguish target features including a barrel of a self-propelled howitzer or a turret size.

Still yet another embodiment of the method is wherein the LIDAR lases using multiple laser lines to perform limited multispectral sensing, such as 2, 3, 4 or N lines coupled together at the fiber tip using the actuators and lens to provide sensing of terrain.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 2A and FIG. 2B are diagrams of another embodiment of the system for sensor fusing using a 3D fiber coupled scanning LIDAR for target identification according to the principles of the present disclosure.

FIG. 3 is a diagram of another embodiment where a LIDAR is mounted with a small gimbal to point at the target once it has been identified and queued by the LWIR imager according to the principles of the present disclosure.

DETAILED DESCRIPTION OF THE DISCLOSURE

Figure 1:
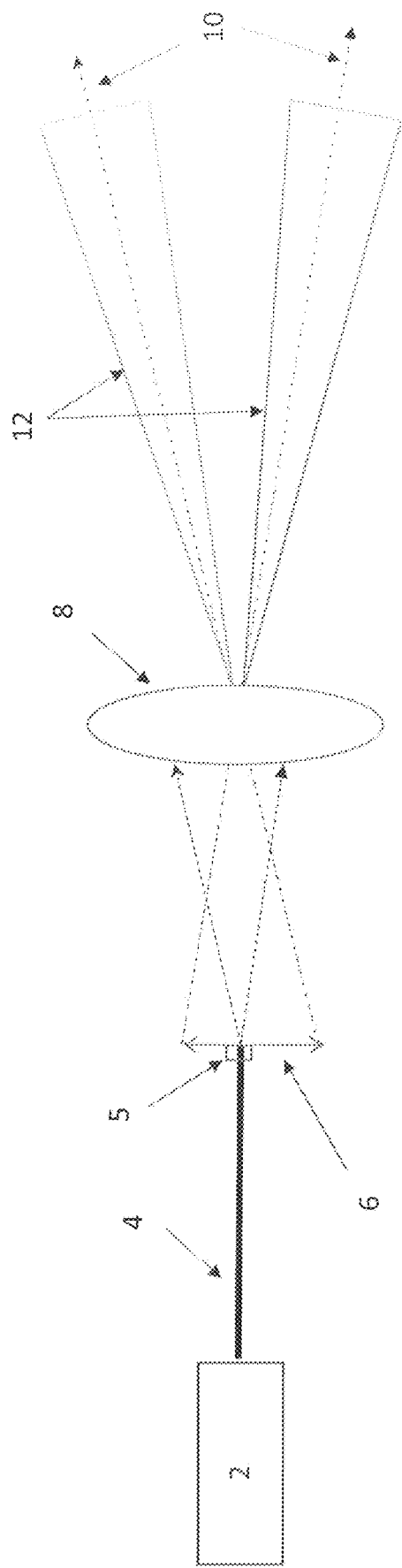
FIG. 1 is a diagram of one embodiment of the system for sensor fusing using a 3D fiber coupled scanning LIDAR for target identification according to the principles of the present disclosure.

One embodiment of the system of the present disclosure uses a 3D LIDAR system on board a round. This system and method are applicable to any round looking for a 3D target ID and in one example the round can be implemented at a 1 to 3 Km range. A round, as used herein, may be a weapon, a projectile, a ballistic, a bullet, a munition, a guided weapon, or the like. It is important to note that rounds are under severe size, weight and power (SWaP) constraints. By coupling a fiber laser with a piezoelectric oscillator, piezoelectric actuator, or the like, and an avalanche photodiode (APD) detector array, a small compact 3D LIDAR can be deployed on a round and provide target dimensional information and thereby increase the probability of an accurate target ID.

In one embodiment of the system, a low cost semi-active laser (SAL) seeker, uses a mono pulse laser in a continuous mode to light up a target such that the imager captures a reflection off the target. In one example this can be a 5 by 5 pixel region within the detector array. In one embodiment, a scanning motion is produced via a piezoelectric/fiber configuration without a gimbal. Running in burst mode (e.g., 100 to 200 Hz), a 10 by 20 pixel region can be "painted" on the target (and subsequently detected) in a short time frame such as in 0.08 to 0.4 seconds, thereby generating a 3D rendering of the target. In certain embodiments, the target information obtained from the scanning data comprises a target pose and three dimensions of the target. By coupling this target dimensional information with images captured by an LWIR imager, one can more quickly determine an accurate target ID.

The system of the present disclosure has a SAL seeker, coupled with a piezoelectric/fiber laser configuration, to provide a target identification module onboard a round with minimal additional size and weight while also lowering the cost and increasing the reliability of the resulting target ID. In certain embodiments, the system can also be applied as a scanner for looking for in-band optics for use in threat assessments. In some cases, a gimbal can be used for gross positioning (2 to 5 Hz bandwidth over a large FOR, e.g., 10s of degrees), and the high frequency (e.g., 0.5 to 1 KHz) response is managed by moving the laser fiber's centerline with the piezoelectric oscillator, actuator, or the like to control the position of the laser fiber relative to an objective lens. This approach can negate the round's rotational dynamics and eliminate high and medium response, while substantially lowering the cost, and more importantly, the SWaP for the on-board target identification system, by more than 10× compared to conventional target ID systems.

In one embodiment, the piezoelectric oscillator, piezoelectric actuator, or the like, accurately moves a narrow laser beam (e.g., 200 μrads) at the repetition rate of the fiber laser, e.g. 10's of KHz. In one embodiment, the piezoelectric oscillator, piezoelectric actuator, or the like, moves a 6 μm single mode fiber core at about ±30 μm or ±0.0013 inches such that the scanner covers a 10 by 10 avalanche photodiode (APD) detector pixel set within the detector's pixel array. This allows the system to "paint" a target and allows the detector and processor to piece together a 3D image of the target over a 100 pulses (e.g., for a 100×100 array), assuming 1 pulse per pixel set. Depending on range and target types, a single pulse can cover a single pixel or set of pixels. Depending on the system's range, the target's reflectivity, the weather and the system's optical design, a pulse can illuminate a single pixel, 2 by 2 pixels, or N-by-M pixels.

The pulsed energy is reflected off the target and is collected by the SAL seeker detector array and measures the time of arrival of each pixel in a set. The time arrival, measured at <1 nanosecond (0.5-foot resolution for the 2-way path length) is used to generate a 3D image of the target. Using the agility of piezoelectric oscillators, piezoelectric actuators, or the like, to move the fiber relative to the optic lens assembly, the target area is scanned while the fiber laser generates additional pulses. The collected pulse sets generate a composite 3D image of the target and its immediate surroundings. In certain embodiments, the resolution is limited by the hardware employed; the energy and repetition rate of the laser; the scan frequency of the piezoelectric oscillator, piezoelectric actuator, or the like; and the sensitivity, array size, and time stamp resolution of the APD detector array.

Referring to FIG. 1, a diagram of one embodiment of the system for sensor fusing using a 3D fiber-coupled scanning LIDAR for target identification according to the principles of the present disclosure is shown. More specifically, a fiber laser 2 uses an optical fiber 4 which is configured to be moved 6. In some cases, the end of the optical fiber 4 is moved up and down, which results in a laser beam that is steered up and down and/or moved left and right which results in the laser beam that is steered left and right. In other examples the optical fiber 4 can move in any X or Y coordinate including running patterns.

In certain embodiments, a lens 8 having a focal length is used. The movement 6 of the optical fiber tip divided by the focal length of the lens 8 defines a field of regard (FOR) 10 for the system. Beam widths 12 are defined by the optical fiber 4 divided by the lens's focal length. In one embodiment, laser diodes 2 are coupled to a fiber optic cable 4, to route the laser energy for use in the scanning target ID system. In one embodiment, the fiber optic cable comprises a fiber bundle. By holding the tip of the optical fiber 4 in the focus of the lens assembly, the FOV of the system is defined by the core diameter of the optical fiber divided by the effective focal length of the lens. The field of regard (FOR) for the system is defined by the fiber's motion 6 via the motion of the piezoelectric oscillator, piezoelectric actuator, or the like 5, divided by the lens's focal length. Fiber laser technology is typically within the NIR (0.7 to 1.0 um) and SWIR (1.0 to 1.7 um) bands, as well as in the MWIR (3 to 5 um) and LWIR (8 to 12 um) bands. The current applications, described herein, are typically in the NIR or SWIR bands, utilizing conventional visible optics extended in the NIR and SWIR bands.

One example of the present disclosure is a 6 um optical fiber used behind a 10 mm focal length lens which yields a 600 μm or 0.6 mrad FOV. By moving the fiber tip in a lateral direction (up or down or left or right) relative to the lens's centerline, the direction of the FOV shifts by the fiber movement divided by the lens's focal length to scan an area at or near the target. If the actuators move by 100 μm, the FOR is +/−10 mrads. In some cases, piezoelectric oscillators, piezoelectric actuators, or the like 5, can be designed to meet the system's overall FOV and FOR requirements e.g., by meeting total fiber motion requirements and positional accuracy of the system, as defined by the fiber core size and lens focal length, as described above.

Referring to FIG. 2A, a diagram of another embodiment of the system for sensor fusing using a 3D fiber coupled scanning LIDAR for target identification according to the principles of the present disclosure is shown. More specifically, a fiber laser 2' uses an optical fiber cable 4' which is configured to be moved 6' at the tip. In some cases, the end (or tip) of the fiber 4' is moved up and down or left to right, or some combination of the two, using piezoelectric oscillators, piezoelectric actuators, or the like 5', which results in a beam that is steered up and down or left or right or some combination of the two to scan an area on or around a target within a scene 16'. In certain embodiments, a lens 8' having a focal length is also present. The movement of the fiber tip 6' produces N by N scan positions 14' within a scene 16'. Referring to FIG. 2B, a diagram of the embodiment of the system for sensor fusing using a 3D fiber coupled scanning LIDAR for target identification in FIG. 2A is shown separately for clarity such that the beams 14' are reflected 14 off the scene 16' and passed through an optic 18 to an avalanche photo diode (APD) detector array 20, or the like, as part of a spatial receiver with ranging capabilities 22 located on-board a round.

In one embodiment, a LIDAR and a SWIR avalanche photodiode (APD) detector array are used. In some cases, InGaAs arrays which are 30 by 30 arrays and larger are used to detect the incoming reflected signals. One advantage of using an APD is that the system is approximately 10× more sensitive than conventional photon detector receivers. In some cases, the ability to add an asynchronous event via a ROIC with a high resolution time stamp of ~1 nanoseconds, provides for a system with an extended range (e.g., 1 to 3 Km), multiple pixels per pulse (e.g., 3 by 3), and a 6 inch range resolution (e.g., 1 nanosecond), using a ~100 μJ laser in either NIR or SWIR bands. In certain embodiments, the system can scan and process a 10 by 20 pixel target area in about 0.11 seconds. As the laser energy improves, receiver sensitivity and the immediate coverage area can expand. Additionally, range extension can be realized.

Referring to FIG. 3, a diagram of another embodiment where a LIDAR is mounted with a small gimbal to point at the target once the target has been initially identified and queued by the LWIR imager according to the principles of the present disclosure is shown. More specifically, the system comprises a fiber laser 32 using an optical fiber 34 which is configured to be moved at the tip 36. In some cases, the end (or tip) of the fiber is moved up and down or the like, using a piezoelectric oscillator, piezoelectric actuator, or the like 35, which results in a beam that is steered up and down 36 or the like. The actuator moves in the opposite direction of the beam movement proportional to the focal length of the lens assembly. The angle movement is simply the actuator movement/distance divided by the lens focal length. Depending on the required accuracy, the actuator can be control in an open or closed loop servo, resulting resolution ranging from few μrads (2 to 5) to several mrads (10 to 20) of resolution.

In certain embodiments, a lens 38 having a focal length is present. The movement 36 of the tip of the fiber 34 produces N by N scan positions 44 along a scene 46 such that the reflected beams 44' off the scene 46 are passed through an optic 48 to an avalanche photo diode (APD) detector array 40, or the like, as part of a spatial receiver with ranging capabilities 42 located on-board a round 30. In this embodiment, a gimbal 50 is in communication with a processor 52 that is in further communication with an imager 54 used to capture images of the scene 46. The captured images by the imager 54 are processed via the processor 52 and are compared with library images in memory 56 for use in automatic target recognition (ATR) or the like. The output of the ATR, or the like, combined with a potential target list provides information for use by the 3D LIDAR system to map the potential targets with the scene for dimensional information which can be used to confirm target ID or lower the target confidence with the dimensional information.

Figure 4:
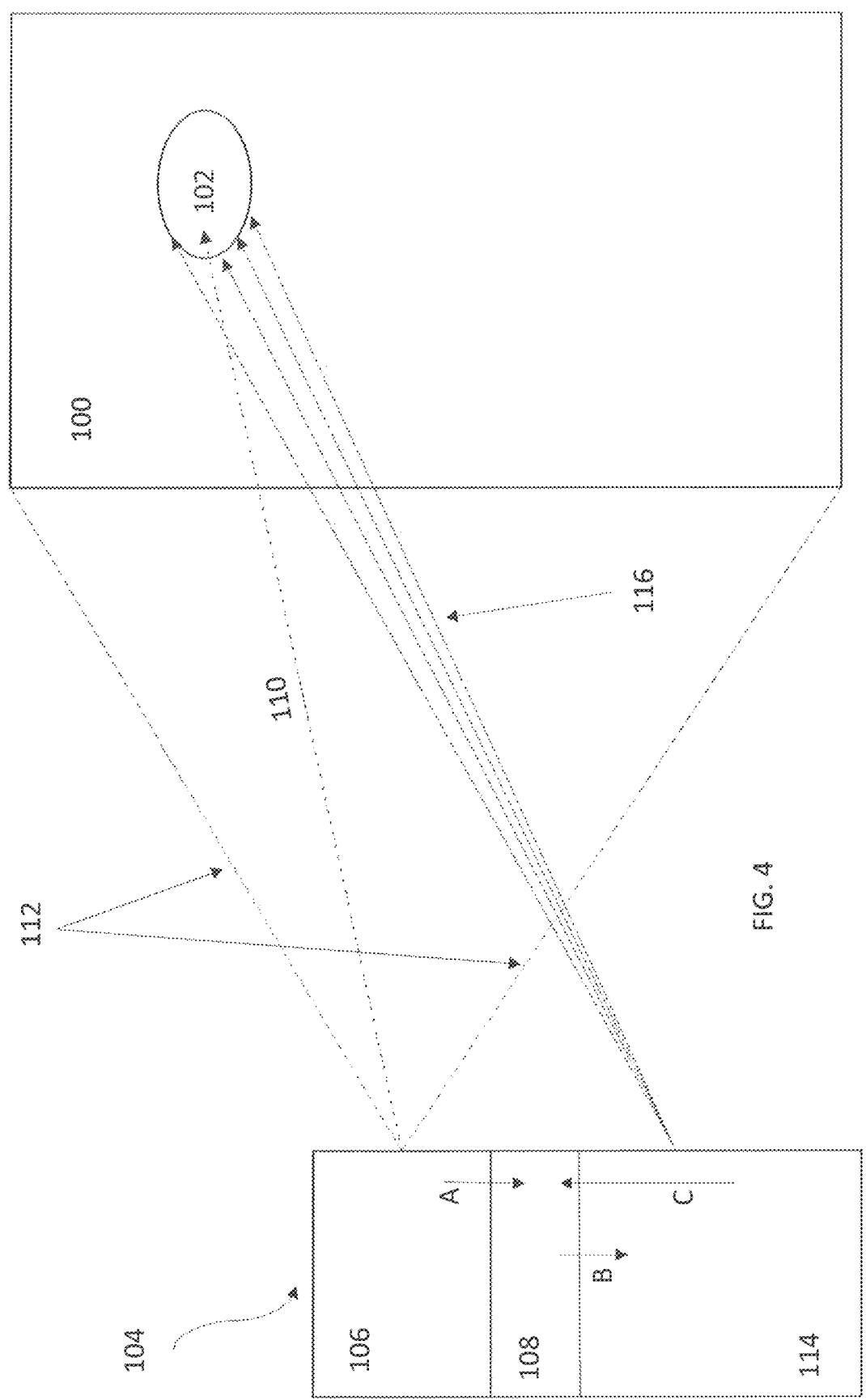
FIG. 4 is a diagram of one embodiment where a LIDAR is mounted with a small gimbal to point at the target once it has been identified and queued by the LWIR imager according to the principles of the present disclosure.

Referring to FIG. 4, a diagrammatic view of one embodiment of a LIDAR 114 attached to a gimbal to point at a target to do a fine scan of the target area after the target has been initially identified and queued by a LWIR imager 106 according to the principles of the present disclosure is shown. More specifically, an area of a scene 100 around a target 102 is shown. An on-board system 104 comprises an imager 106 in communication with a processor 108. In certain embodiments, the imager is an LWIR imager. The imager is used to detect a location 110 of a target 102 within the FOV of the imager 112. The on-board system, in some cases, further comprises a narrow FOV (e.g., 0.2 to 2 mrads) LIDAR 114 attached to a gimbal. In some cases, the LIDAR is an NIR or SWIR LIDAR. Piezoelectric actuators, or the like (not shown) are used to control movement of an optical fiber to generate a localized scan pattern 116 of the target 102 identified by the imager.

Figure 5:
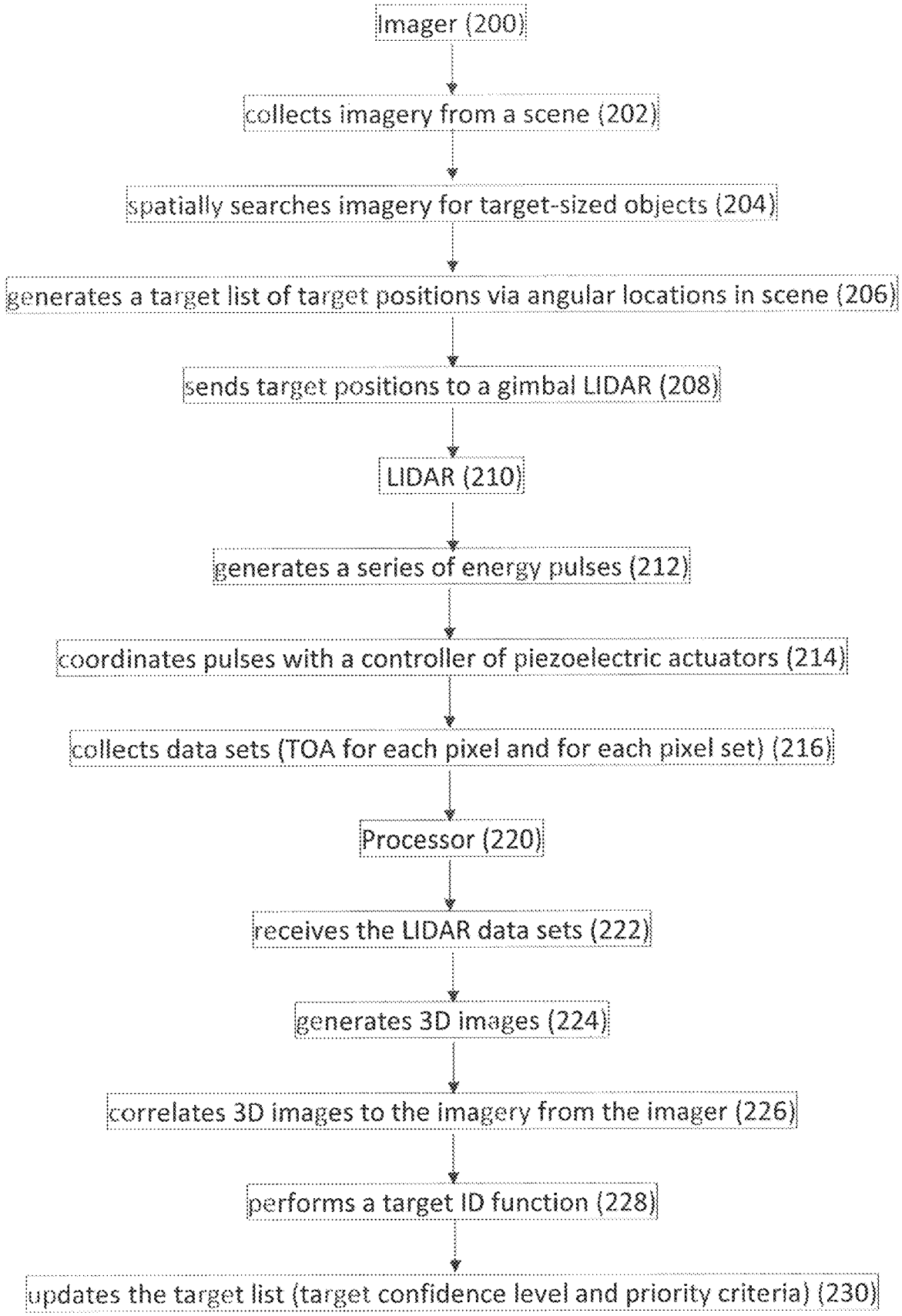
FIG. 5 is a flow chart of the method of using the LWIR imager and the LIDAR as seeker according to the principles of the present disclosure.

Referring to FIG. 5, a flow chart of a method of using the LWIR imager and the LIDAR according to the principles of the present disclosure is shown. More specifically, an imager 200 is used, having comparatively low resolution, such as an LWIR imager. The imager collects imagery from an area of a scene 202 within its field of view (FOV). The imager spatially searches the imagery collected for target-sized objects 204. The imager generates a potential target list (or queue) comprising potential targets and their respective positions 206. In some cases, the positions are calculated using angular location within the area of the scene. Once the target queue has been created, it is passed on to an LIDAR module 208. In some cases, the LIDAR module further comprises a gimbal LIDAR 210 with the ability to point the LIDAR subsystem in one or both angular directions. The gimbal complexity can range from small angle changes (2 to 10 degrees) using a second set of three actuators where the actual length of the three legged set from a different base plane for pointing the LIDAR housing to a full pan (360 degrees) tilt (−20 to 90 degrees) gimbal covering the full regard of the weapons nose.

Still referring to FIG. 5, the LIDAR generates a series of energy pulses 212, which are coordinated with a controller of one or more a piezoelectric oscillators, piezoelectric actuators, or the like 214. The LIDAR module collects data sets comprising time of arrival (TOA) for pulses reflected of a scene at each pixel in an array, as well as each pixel set (e.g., 2-by-2) 216. The data sets comprise information gathered from an area around the identified targets via scanning using the piezoelectric oscillators, piezoelectric actuators, or the like to map the target area with the LIDAR beam. A processor 220 receives the data sets from the LIDAR 222 to generate 3D images of the one or more targets/target areas 224 by simply plotting TOA for each pixel (row and column). In a non-moving target scenario, the differential in the TOA measurement at each pixel generates a 3D map of topographic features/contours. For example, if one were viewing straight down the result would be analogous to a topographical map. When viewed from a slant angle the 3D map needs to account for the projection angle and deal with shadows generated by taller objects, for example. If the platform (e.g., round) is moving, the velocity needs to be accounted for between 3D LIDAR scans since the TOA will be different for each pulse. If a high PRF laser, 10 to 50 KHz is employed, the distance of each pulse set would correspond to 0.033 to 0.0066 meters respectively. In one example, a 1-meter change in range depth would correspond to 30 and 150 pulse set when traveling at Mach 1 (330 m/s) with no compensation.

In one embodiment, the processor correlates the 3D images to the imagery from the imager 226 and performs a target ID function 228. The LIDAR provides the target's dimensions (e.g., length, width and height), pose—orientation of the target in the imager's FOV, and 3D contour which is combined with the imager's contour lines to provide a high level library match. The target list, or queue, is then updated based on target confidence levels and any target priority criteria for the particular mission 230. The imager provides contrast lines, which defines form, which is then the basis for target ID. Contrast can be spoofed with paint, denying the imagers ability to deform form by confusing the contrast lines that defines edges. Addition of the 3D LIDAR, which relies on TOA, is independent of the paint, color, or reflectivity of the object. It measures form by TOA. The 3D model, combined with a thermal rendering of the thermal signature generates a higher level of confidence that the target selected is the optimum choice. Confidence level could be defined by >90% if the data meets all three dimensions for a particular target in the library, has the expected thermal signature, (e.g., hot barrel, engine, and contours or internal features/contours) that match the target model. As the 3D LIDAR image match is degraded (meets the length and height criteria but the width is wider), or the lack of a viable thermal signature, the rank of that specific target among other targets being observed may be lowered based on the importance of each target criteria and the priority of the mission target set. For example, you may get an excellent match for dimension and thermal signature for a fuel truck (95% confidence) and get a less than perfect match for a missile launcher due to poor thermal signature and only 2 out of the 3 dimensions (50% confidence), but the priority is on the missile launcher and the mission criteria is 50% is sufficient for the class of target. The criteria for LIDAR, thermal signature, convolved with target types and rules of engagement allow for different outcomes.

Figure 6A:
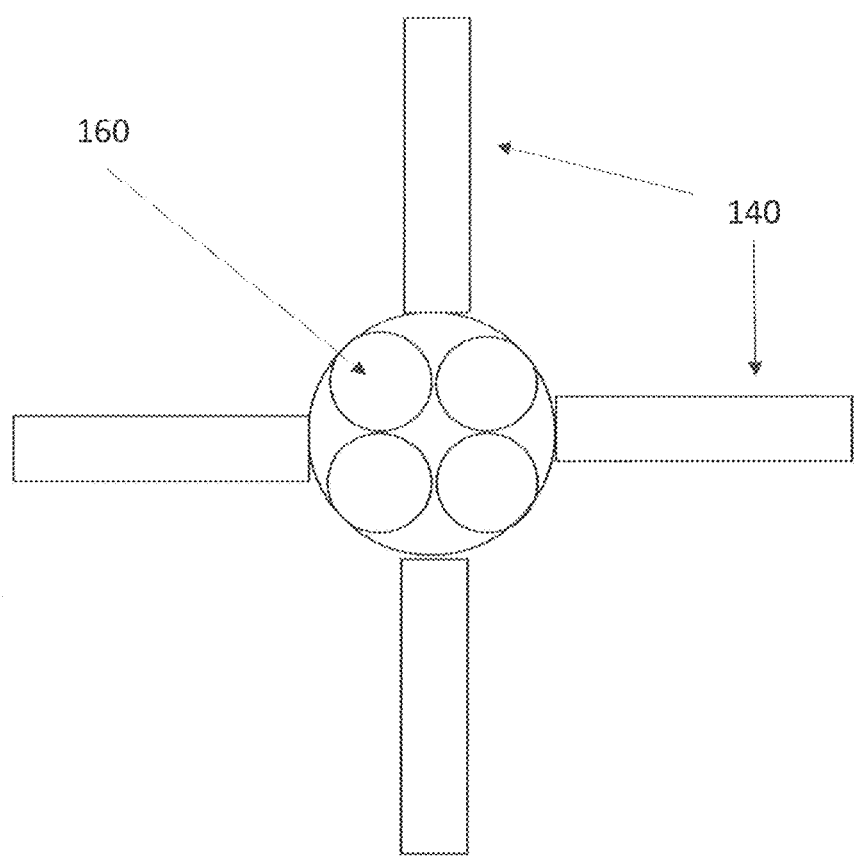
FIG. 6A is a diagram of a fiber optic bundle, here 2 by 2 fibers, controlled by an actuator set for vertical and horizontal positioning, according to one embodiment of the present disclosure.

In FIG. 6A, a diagram of a fiber optic bundle, here 2 by 2 fibers, controlled by an actuator set for vertical and horizontal positioning, according to one embodiment of the present disclosure is shown. More specifically, the approach of lasing more than one line for multispectral, 3D LIDAR and amplitude response, is facilitated be using the fiber scanner, which can move 1 or n by n fiber cores to allow multispectral scanning. Here, an actuator set 140 is shown around a bundle, here of 2×2 fibers 160. In certain embodiments, the development of DROIC allows for generating high fidelity TOA measurements with amplitude measurement to form an image. Using the amplitude measurement and interleaving the pulse energy for each of the laser lines in the SWIR band, one can measure the 3D image and measure the spectral content of the image to enhance targeting discrimination from the background.

Figure 6B:
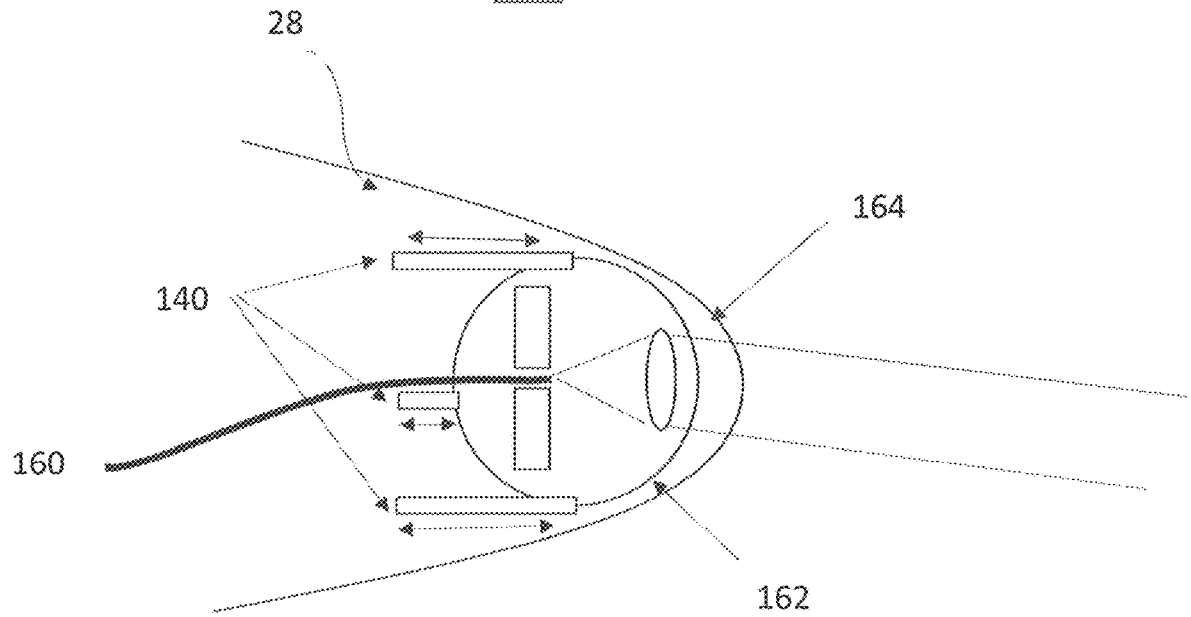
FIG. 6B is a diagram of a fiber optic bundle controlled by an actuator set for vertical and horizontal positioning within a nose of a round according to one embodiment of the present disclosure.

Referring to FIG. 6B, a diagram of a fiber optic bundle controlled by an actuator set for vertical and horizontal positioning within a nose of a round according to one embodiment of the present disclosure is shown. More specifically, a fiber optical cable 160 is directed suing an actuator set 140 acting on a gimbal 162 for both azimuth and elevation control. In some cases, the gimbal structure can be located in the nose of a round 28. In certain embodiments, a dome window 164, or the like is also present.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A LIDAR system for target identification, comprising:
   an imager configured to:
      collect imagery from a scene within a field of view of the imager;
      spatially search the imagery for target-sized objects; and
      generate a target list of potential targets and respective target positions;
   a fiber laser coupled to an optical fiber with a field of view augmented with controlled piezoelectric actuators that move the optical fiber and being configured to:
      generate a series of energy pulses; and
      coordinate the series of energy pulses via a controller for the controlled piezoelectric actuators to generate a high fidelity scan pattern where the energy pulses are distributed to correspond to each pixel for a given field of regard; and
   a processor configured to:
      receive data sets from the imager comprising time of arrival for the series of pulses reflected off an area of the scene selected based on the target list, and corresponding intensity at each pixel;
      generate 3D images of an area of the scene selected based on the target list;
      correlate the 3D images to the imagery from the imager, wherein the processor determines features for the potential targets;
      performs a target identification function; and
      update the target list;
      wherein the LIDAR systems is mounted on a round.

2. The system according to claim 1, wherein the fiber laser is a SWIR fiber laser and the imager is an avalanche photodiode (APD) detector array.

3. The system according to claim 1, wherein the imager is an LWIR imager.

4. The system according to claim 1, wherein the target list is updated based on target confidence levels and target priority criteria.

5. The system according to claim 1, wherein the target list is generated based on angular locations in the scene.

6. The system according to claim 1, wherein the data sets comprises time of arrival information for each pixel and for each pixel set collected via the imager.

7. The system according to claim 1, wherein the controlled piezoelectric actuators further comprises a gimbal to decouple a center line of the imager.

8. A method for target identification for a round, comprising:
   collecting imagery from a scene via an imager;
   spatially searching the imagery for target-sized objects via the imager;
   generating a target list of potential targets and respective target positions via the imager;
   generating a series of energy pulses via the fiber laser;
   coordinating the series of pulses of the fiber laser via a controller, wherein the series of pulses are transmitted by an optical fiber that is moved by one or more piezoelectric actuators for scanning the scene; and
   collecting data sets, via the imager, comprising time of arrival for the series of pulses reflected off an area of the scene selected based on the target list, and corresponding intensity at each pixel in a detector of the imager;
   receiving the data sets from the imager at a processor;
   generating, via the processor, 3D images of an area of the scene selected based on the target list;
   performing, via the processor, a target identification using a library of known targets; and
   updating the target list via the processor to identify a selected target,
   guiding the round to the selected target.

9. The method according to claim 8, wherein the LIDAR is a SWIR LIDAR and the detector is an avalanche photodiode (APD) detector array.

10. The method according to claim 8, wherein the imager is an LWIR imager.

11. The method according to claim 8, wherein the target list is updated based on target confidence levels and target priority criteria.

12. The method according to claim 8, wherein the target list is generated based on angular locations in the scene.

13. The method according to claim 8, wherein the data sets comprises time of arrival information for each pixel and for each pixel set.

14. The method according to claim 8, further comprising utilizing the processor to determine the dimensions, pose and 3D contours for the potential targets combined with contour lines from the imager to provide a high level library match of the selected target.

15. The method according to claim 8 further comprising utilizing one or more of a height, a length, and a width measurement to eliminate targets of the wrong scale and size.

16. The method according to claim 14, further comprising utilizing the processor to determine a pose of one or more targets and selectively processing specific poses rather than all possible poses presented in the library of a specific target or set.

17. The method according to claim 14, further comprising providing internal form features' dimensions via the processor to distinguish target features including a barrel of a self-propelled howitzer or a turret size.

18. The method according to claim 8, wherein the one or more piezoelectric actuators further comprises a gimbal to decouple a center line.

19. The method according to claim 8, wherein the series of pulses lases the one or more targets completely or in sections by using the piezoelectric actuators for controlling the optical fiber position relative to a lens.

20. The method according to claim 19, wherein the series of pulses lases using multiple laser lines to perform limited multispectral sensing, such as 2, 3, 4 or N lines coupled together at a fiber tip of the optical fiber using the piezoelectric actuators and at least one lens to provide sensing of terrain.

* * * * *